(12) United States Patent
Saxena et al.

(10) Patent No.: US 10,101,499 B2
(45) Date of Patent: Oct. 16, 2018

(54) HYDROPHILIC MACROMERS AND HYDROGELS COMPRISING THE SAME

(71) Applicants: Anubhav Saxena, Bangalore (IN); Monjit Phukan, Bangalore (IN); Shreedhar Bhat, Bangalore (IN); Kenrick M. Lewis, Flushing, NY (US); Senthilkumar Umapathy, Bangalore (IN)

(72) Inventors: Anubhav Saxena, Bangalore (IN); Monjit Phukan, Bangalore (IN); Shreedhar Bhat, Bangalore (IN); Kenrick M. Lewis, Flushing, NY (US); Senthilkumar Umapathy, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 14/492,722

(22) Filed: Sep. 22, 2014

(65) Prior Publication Data

US 2015/0011667 A1  Jan. 8, 2015

Related U.S. Application Data

(63) Continuation of application No. PCT/US2013/029370, filed on Mar. 6, 2013.

(60) Provisional application No. 61/614,222, filed on Mar. 22, 2012.

(51) Int. Cl.
| | |
|---|---|
| C08G 77/20 | (2006.01) |
| G02B 1/04 | (2006.01) |
| C08G 77/46 | (2006.01) |
| C08L 83/04 | (2006.01) |
| C08L 83/08 | (2006.01) |

(52) U.S. Cl.
CPC ............. *G02B 1/043* (2013.01); *C08G 77/20* (2013.01); *C08G 77/46* (2013.01); *C08L 83/04* (2013.01); *C08L 83/08* (2013.01); *C08L 2201/10* (2013.01)

(58) Field of Classification Search
CPC ......... C08L 83/04; C08L 83/08; C08G 77/20; C08G 77/36; G02B 1/043
See application file for complete search history.

(56) References Cited

U.S. PATENT DOCUMENTS

| | | | |
|---|---|---|---|
| 4,260,725 A | 4/1981 | Keogh et al. | |
| 5,352,714 A | 10/1994 | Lai et al. | |
| 5,480,634 A * | 1/1996 | Hayama | A61K 8/895 424/70.12 |
| 5,998,498 A | 12/1999 | Vanderlaan et al. | |
| 6,013,711 A | 1/2000 | Lewis et al. | |
| 6,207,782 B1 * | 3/2001 | Czech | A61K 8/06 424/401 |
| 6,867,245 B2 | 3/2005 | Iwata et al. | |
| 2007/0160649 A1 | 7/2007 | Schorzman | |
| 2008/0004414 A1 | 1/2008 | Schorzman | |

(Continued)

FOREIGN PATENT DOCUMENTS

| | | |
|---|---|---|
| EP | 2177556 A2 | 4/2010 |
| WO | 2010038242 A3 | 4/2010 |

(Continued)

OTHER PUBLICATIONS

Patent Cooperation Treaty (PCT), International Search Report and Written Opinion for Application PCT/US2013/029370 filed Mar. 6, 2013, dated May 8, 2013 International Searching Authority, US.

*Primary Examiner* — Margaret G Moore
(74) *Attorney, Agent, or Firm* — Joseph Ostroff; McDonald Hopkins LLC

(57) ABSTRACT

A composition, suitable for use in producing hydrogel polymer films from which biomedical devices such as contact lenses can be made, comprising at least one hydrophilic silicone macromer. In one aspect, a hydrophilic silicone macromer is of the Formula 1:

$$X\text{—}Si(R^1)(R^2)O\text{—}(Si(R^3)(R^4)O)_a\text{—}Si(R^5)(R^6)\text{—}Y \quad (1)$$

wherein $R^1$, $R^2$, $R^3$ $R^4$, $R^5$ and $R^6$ are independently selected from a monovalent linear, branched, or cyclic radical with 1 to 50 carbon atoms, that can optionally contain a heteroatom or I; I is $R^L\text{—}R^P$; Y is a free radical polymerization-effective hydrophilic group with the general structure: $R^L\text{—}R^P\text{—}Z$; $R^L$ is a linking residue from a non-isomerizable hydrosilylation effective terminal olefin comprising the general structure $\text{—}CH_2\text{—}C(R^bR^7)\text{—}(CR^8R^9)_n$, the subscript n is selected from integers from 1 to 10; $R^7$, $R^8$, and $R^9$ can be selected from hydrogen and a mono-valent hydrocarbon radical with 1 to 10 carbon atoms that optionally contain a heteroatom; $R^b$ is selected from a monovalent hydrocarbon radical with 1 to 6 carbon atoms; $R^P$ is a spacer group comprising a diavelant hydrophilic organic radical with 0 to 100 carbon atoms and optionally contains heteroatoms, and X is a free radical polymerizable group. The said composition can be polymers and films suitable for use in making contact lenses.

24 Claims, No Drawings

(56) References Cited

U.S. PATENT DOCUMENTS

| | | | |
|---|---|---|---|
| 2009/0299022 A1* | 12/2009 | Ichinohe | C07F 7/0852 |
| | | | 526/279 |
| 2010/0093963 A1* | 4/2010 | Ichinohe | C08G 77/10 |
| | | | 526/279 |
| 2010/0120938 A1 | 5/2010 | Phelan et al. | |
| 2010/0249273 A1 | 9/2010 | Scales | |
| 2010/0298591 A1 | 11/2010 | Arkles et al. | |
| 2011/0181833 A1* | 7/2011 | Guyer | C07F 7/0852 |
| | | | 351/159.33 |
| 2012/0245249 A1* | 9/2012 | Saxena | C08L 43/04 |
| | | | 523/122 |
| 2014/0024791 A1* | 1/2014 | Alli | C08F 283/124 |
| | | | 526/212 |

FOREIGN PATENT DOCUMENTS

| | | |
|---|---|---|
| WO | 2010071691 A1 | 6/2010 |
| WO | 20120154268 A1 | 11/2012 |

\* cited by examiner

HYDROPHILIC MACROMERS AND HYDROGELS COMPRISING THE SAME

CROSS REFERENCE TO RELATED APPLICATIONS

This application is a continuation of International Patent Application No. PCT/US2013/029370, entitled "Hydrophilic Macromers And Hydrogels Comprising The Same", filed on Mar. 6, 2013, which claims the priority benefit of U.S. Provisional Patent Application No. 61/614,222, entitled "Hydrophilic Macromers And Hydrogels Comprising The Same", filed on Mar. 22, 2012, each of which are hereby incorporated in their entirety by reference.

FIELD OF THE INVENTION

The present invention relates to hydrophilic organo-modified silicone-containing macromers and polymers produced therefrom. The present invention relates, in one aspect, to linear hydrophilic organo-polysiloxane macromers and polymers derived therefrom. The present invention also relates to hydrogel compositions and films suitable for producing biomedical products including contact lenses.

BACKGROUND

Silicone-hydrogel films are used to make extended wear soft contact lenses due to their relatively high oxygen permeability, flexibility, comfort, and reduced corneal complications. Conventional hydrogel materials (e.g. 2-hydroxyethyl methacrylate, HEMA) by themselves have poor oxygen permeability and they transport oxygen to the eye through the absorbed water molecules. Water has low oxygen permeability, also called the Dk value, which may be expressed in Barrer, wherein 1 Barrer=$10^{-11}$ (cm$^3$ O$_2$) cm cm$^{-2}$ s$^{-1}$ mmHg$^{-1}$ where "cm$^3$ O$_2$" is at a quantity of oxygen at standard temperature and pressure and where "cm" represents the thickness of the material and "cm$^{-2}$" is the reciprocal of the surface area of that material. The Dk of water is 80 Barrer. Upon exposure to atmospheric air for long periods, these lenses are slowly dehydrated and the amount of oxygen transported to the cornea is reduced. Eye irritation, redness and other corneal complications can result and hence restrict use of the lenses to limited periods of wear.

Silicone-hydrogels with the comfort of soft contact lenses and significantly higher oxygen permeability overcame the obstacles for periods of wear beyond conventional hydrogels and were revolutionary in the field of optometry. The following patents describe silicone-hydrogels for use in contact lenses.

U.S. Pat. No. 4,260,725 assigned to Bausch & Lomb, Inc. describes a water absorbing, soft, hydrophilic, flexible, hydrolytically stable, biologically inert contact lens with the capability of transporting oxygen sufficiently to meet the requirements of the human cornea comprising a polysiloxane which is α,ω terminally bonded through divalent hydrocarbon groups to polymerizably activated unsaturated groups and which contain hydrophilic sidechains.

U.S. Pat. No. 5,352,714 also assigned to Bausch & Lomb, Inc. describes silicone-containing hydrogels with enhanced wettability comprising a silicone-containing monomer, hydrophilic monomers, and a relatively non-polar ring-containing monomer able to be converted to a highly polar amino acid upon hydration.

U.S. Pat. No. 5,998,498 assigned to Johnson & Johnson Vision Products describes a silicone hydrogel prepared by curing a reaction mixture comprising a silicone-containing monomer having the following structure:

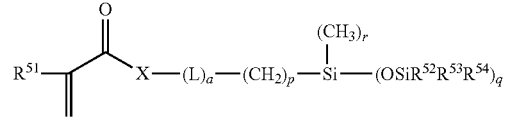

wherein $R^{51}$ is H or CH$_3$, q is for 2 and for each q, $R^{52}$, $R^{53}$ and $R^{54}$ are independently ethyl, methyl, benzyl, phenyl or a monovalent siloxane chain comprising from 1 to 100 repeating Si—O units, p is 1 to 10, r=(3-q), X is 0 or NR$^{55}$, where $R^{55}$ is H or a monovalent alkyl group with 1 to 4 carbons, a is 0 or 1, and L is a divalent linking group which preferably comprises from 2 to 5 carbons, which may also optionally comprise ether or hydroxyl groups, for example, a polyethylene glycol chain.

U.S. Pat. No. 6,867,245 assigned to Asahikasei Aime Co. describes a soft contact lens, and provides a contact lens that shows small and stable contact angle to water at its surface in water as well as in air, little deposition in wearing, high oxygen permeability, no adhesion of lens to a cornea, and superior extended-wearing characteristics. It describes a hydrogel soft contact lens, which has a contact angle at a lens surface in a range of 10-50° by the captive bubble method in water and 3 & 90° by the sessile drop method in air, oxygen permeability of not less than 30 and water content of not less than 5%, and also a hydrogel soft contact lens consisting of a polymer comprising a hydrophilic siloxanyl monomer shown by a specified general formula. This patent discloses copolymers of hydrophilic siloxane with amide-group containing monomers that are stated as being useful materials for contact lenses. The polymer comprises hydrophilic amide-group containing siloxanyl methacrylate, a siloxanyl methacrylate (tris[trimethylsiloxy] silylpropylmethacrylate, abbreviated as TRIS) including a hydrophilic polyether modified siloxanyl alkyl methacrylate and a cross-linkable monomer.

U.S. Pat. No. 6,013,711 assigned to the CK Witco Corporation describes a method for improving the miscibility of the lower molecular weight unsaturated siloxane-polyether copolymers with the α,ω-divinylpolysiloxanes without loss of storage stability, or delay of cure at the vulcanization temperature, or loss of permanent hydrophilicity or other desirable features of the cured polysiloxane. The compositions comprise one or more α,ω-divinylpolysiloxanes, unsaturated polysiloxane-polyether copolymers having from 2 to 5 silicon atoms per molecule, which are preferably trisiloxanes, and a compatibilizing additive. The permanently hydrophilic, rapidly wettable polysiloxane compositions yield static water contact angles <50° and dynamic advancing contact angles of less than about 100.

U.S. Pat. No. 6,207,782 assigned to Crompton Corporation discloses acrylated hydrophilic polysiloxanes monomers and polymers and their copolymers with acrylate/methacrylate comonomers and their emulsions for personal care, textile and coating applications. The acrylated siloxanes are represented by formula (a):

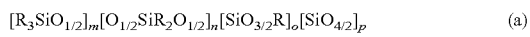

wherein R is selected from the $R^1$ and P, wherein each $R^1$ can be the same or different and each is a monovalent hydrocarbon group; each P is $R^3[O(C_bH_{2b}O)_zCOCR^4=CH_2]_g$ wherein, $R^3$ is a polyvalent organic moiety, which may be hydroxy substituted alkylene, g is the valency of $R^3$ minus 1, $R^4$ is hydrogen or methyl; b=2 to 4, preferably 2 to 3; z=1 to 1000, preferably 3 to 30; and m+n+p+o=1 to 100, preferably 2 to 20, at least one R is P; n=1 to 100; when o is not zero n/o<10:1; when p is not zero n/p<10:1; and m=0 to 10. A preferred acrylated siloxane of the invention in U.S. Pat. No. 6,207,782 is of the Formula (b)

   (b)

wherein x and y can be 0 or an integer, preferably each x and y are from 0 to 100, most preferably 0 to 25; Q can be $R^1$ or P, with the proviso that the average acrylate functionality is >1 unsaturated groups per molecule with the preferred embodiment having y=0 and Q=P.

Conventionally, silicone-hydrogels are made by polymerizing the acrylate or methacrylate functionalized silicone monomer with hydrogel (hydrophilic) monomers, such as 2-hydroxyethyl methacrylate (HEMA), N-Vinylpyrrolidone (NVP) and other monomers such as methyl methacrylic acid (MMA), Dimethylacrylamide (DMA), etc., in the presence of cross-linker and free radical or photoinitiators. Cross-linking agents generally have two or more reactive functional groups at different sites of the molecule. Typically, these sites contain polymerizable ethylenic unsaturation groups. During curing, they form a covalent bond with two different polymer chains and form a stable three-dimensional network to improve the strength of the polymer. Crosslinking agents conventionally used in contact lenses include ethylene glycol dimethacrylate and trimethyloylpropane trimethacrylate (about 0.1 to 2 wt. %). Other useful crosslinking agents include diethyleneglycol dimethacrylate, bisphenol A dimethacrylate, diglycidyl bisphenol A dimethacrylate and dimethacrylate-terminated polyethylene glycol and reactive linear polyether modified silicones.

Generally, silicone hydrogel contact lens materials are made using either hydrophobic mono-functional silicone monomer (such as TRIS) or multi-functional hydrophilic silicone monomer followed by secondary surface treatment. Mono-functional silicone monomers are preferred in the contact lens industry over multi-functional silicone monomers since the latter lead to increased rigidity of the lens made therefrom.

The state of this art for soft contact lenses, including the silicone-based materials described in the above mentioned patents, still possess major shortfalls like sub-optimal surface wettability and lipid deposition. In an effort to overcome these drawbacks, current state of the art technology uses either expensive secondary surface treatments called "plasma oxidation" or use internal wetting agents at the expense of oxygen permeability. Hence there remains a need for hydrophilic silicone monomers with advantageous wettability and oxygen permeability that can be used to make contact lenses without the drawbacks and expensive surface treatments necessary with the silicone containing materials of the present art.

SUMMARY

The present invention discloses hydrophilic compositions comprising linear silicone macromers containing a hydrophilic group, a process to produce such macromers with high purity and ease of manufacturability, and compositions made from these macromers that have greater hydrophilic functionality. These functionalized silicone macromers are useful to make water-absorbing, oxygen-permeable silicone-hydrogel films that can be fashioned into extended wear soft contact lens. In particular, the macromers disclosed in the current invention have a linear free radical polymerization-effective hydrophilic group.

In one aspect, the present invention provides a composition comprising at least one hydrophilic silicone macromer of the Formula 1:

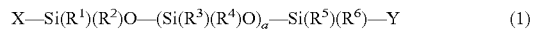   (1)

wherein $R^1$, $R^2$, $R^3$ $R^4$, $R^5$, and $R^6$ are independently selected from monovalent a linear, branched or cyclic radical with 1 to 50 carbon atoms, that optionally contain a heteroatom or I, wherein I is $R^L$—$R^P$ and $R^L$ is a linking residue from a non-isomerizable hydrosilylation effective terminal olefin comprising the general structure —$CH_2$—C($R^bR^7$)—$(CR^8R^9)_n$, n is selected from an integer from 1 to 10; $R^7$, $R^8$, and $R^9$ are independently selected from hydrogen, and a mono-valent hydrocarbon radical with 1 to 10 carbon atoms that optionally contain a heteroatom; $R^b$ is selected from a monovalent hydrocarbon radical with 1 to 6 carbon atoms; $R^P$ is a hydrogen, hydroxyl radical, or a hydrophilic organic radical with 1 to 100 carbon atoms that optionally contain a heteroatom; a is 0 to about 500; X is a free radical polymerizable group chosen from a monovalent linear, branched, or cyclic radical, R, or Y, the linear, branched, or cyclic radicals having 1 to 50 carbon atoms and optionally contain heteroatom; Y is a free radical polymerization-effective group I—Z where Z is a functional moiety, independently selected from a bivalent linear, branched, or cyclic radical with 1 to about 20 carbons, that optionally contain a heteroatom.

In another aspect, the present invention provides polymers, e.g., homopolymers or copolymers, comprising the hydrophilic silicone macromers.

In still another aspect, the present invention provides a hydrogel composition comprising the hydrophilic silicone macromers such as, for example, a hydrophilic silicone macromer of Formula (1). In one embodiment, the hydrogel composition comprises (a) a hydrophilic silicone macromer in accordance with aspects of the invention, (b) a free-radical polymerizable organic monomer, (c) an initiator, and (d) optionally a crosslinker.

The hydrophilic silicone macromers provide a high silicone containing compound that allows for the incorporation of a relatively large concentration of silicone into the hydrogel composition, which provides for higher oxygen permeability and a more comfortable lens.

Silicone hydrogel films produced with these macromers offer improved surface wettability, water absorption, contact angle, oxygen permeability, and mechanical properties in comparison to silicone-hydrogel films prepared from monomers having linear alkyl linking groups, such as those already disclosed in the prior art for contact lens applications.

DETAILED DESCRIPTION

In accordance with aspects of the present invention, new hydrophilic silicone macromers having a free radical polymerization-effective hydrophilic group and useful for preparing water-absorbing silicone hydrogel films that can be used in contact lens applications are described. Silicone hydrogel films obtained with these monomers show excellent wettability, oxygen permeability and desirable modulus in comparison to previously known films.

As used in the specification and including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

A "macromer" refers to a medium and high molecular weight compound that can comprise one or more functional groups capable of being polymerized, cross-linked, or both. A "monomer" refers to a relatively low molecular weight compound that is polymerizable.

A "hydrophilic" substance (e.g., hydrophilic monomer, hydrophilic macromer, hydrophilic polymer, etc.) is one that is water-loving, has an affinity for water, is capable of absorbing water, etc. A hydrophilic substance may be soluble or insoluble (e.g., substantially insoluble) in water. A hydrophilic substance can, in one embodiment, contain both hydrophilic and hyrdrophobic portions, but the hydrophobic portions are present in relative amounts such that the substance or component is hydrophilic. In one embodiment, a hydrophilic substance can absorb at least 10 percent by weight water.

"Homopolymers" are polymers made from the same repeating macromer or monomer. "Copolymers" are polymers wherein the polymer contains at least two structurally different macromers, at least two structurally monomers, or at least one macromer and at least one monomer. Notations such as (meth)acrylate denote monomer with either acrylate or methacrylate functionality.

Hydrophilic Silicone Macromers

In one aspect, the present invention provides a composition comprising at least one linear hydrophilic silicone macromers comprising a linear free radical polymerizable organo-polysiloxane. In one embodiment, the linear silicone macromer can be a macromer described by the general structure of Formula 1:

$$X—Si(R^1)(R^2)O—(Si(R^3)(R^4)O)_a—Si(R^5)(R^6)—Y \qquad (1)$$

wherein $R^1$, $R^2$, $R^3$ $R^4$, $R^5$, and $R^6$ are independently selected from a monovalent linear, branched, or cyclic radical with 1 to 50 carbon atoms, that optionally contain a heteroatom or I, wherein I is $R^L—R^P$, $R^L$ is a linking residue from non-isomerizable hydrosilylation effective terminal olefin comprising the general structure —$CH_2$—$C(R^bR^7)$—$(CR^8R^9)_n$, n is selected from an integer from 1 to 10; $R^7$, $R^8$, and $R^9$ are independently selected from hydrogen, and a mono-valent hydrocarbon radicals with 1 to 10 carbon atoms, that and optionally contain a heteroatom; $R^b$ is selected from a monovalent hydrocarbon radical with 1 to 6 carbon atoms; $R^P$ is a hydrogen, hydroxyl radical, a hydrophilic organic radical with 1 to 100 carbon atoms that optionally contain a heteroatom; a is 0 to about 500; X is a free radical polymerizable group chosen from a monovalent linear, branched, or cyclic radical, R, or Y, the linear, branched, or cyclic radical having 1 to 50 carbon atoms and optionally contain a heteroatom; Y is a free radical polymerization-effective group I—Z where Z is a functional moiety independently selected from a bivalent linear, branched, or cyclic radical with 1 to about 20 carbons, that optionally contain a heteroatom.

In one embodiment, the hydrophilic macromer has a general structure of Formula 2:

$$Y—Si(R^1)(R^2)O—(Si(R^3)(R^4)O)_a—Si(R^5)(R^6)—Y \qquad (2)$$

wherein $R^1$, $R^2$, $R^3$ $R^4$, $R^5$, $R^6$, a, and Y can be as described above.

In one embodiment, the polymerizable hydrophilic organo-modified silicone macromer composition generally described by Formula 1 can be a compound having the following a structure according to Formula 3:

$$R—Si(R^1)(R^2)O—(Si(R^3)(R^4)O)_a—Si(R^5)(R^6)—Y \qquad (3)$$

wherein R, $R^1$, $R^2$, $R^3$ $R^4$, $R^5$, $R^6$, a, and Y can be as described above.

In one embodiment, the silicone hydrophilic macromer has a formula according to one of Formulas 1, 2, or 3 where $R^1$, $R^2$, $R^3$, $R^4$, $R^5$, and $R^6$ are independently selected from methyl, ethyl, propyl, isopropyl, phenyl, polyether, and —$CH_2CH_2CF_3$ groups; R is selected from methyl, ethyl, propyl, isopropyl, butyl, and isobutyl groups; the subscript a is selected from 0 to 50, in one embodiment 1 to 50; $R^b$ is methyl; $R^7$, $R^8$ and $R^9$ are hydrogen atoms; the subscript a is selected from 1 to 6, in one embodiment 1 to 3; $R^P$ is a polyether group with the general formula:

—$O(CH_2CH_2O)_b(CH_2CH(CH_3)O)_c$
$(CH_2CH_2CH_2CH_2O)_d$— where b is 1 to 100, c is 0 to 100, d is 0 to 100 such that b+c+d>2; X can be selected from acrylates or acrylamides with the general formula:

$$Z—C(R^{10})=C(R^{11})(R^{12})$$

where $R^{10}$, $R^{11}$, and $R^{12}$ can be selected from hydrogen, monovalent alkyl groups with 1 to 10 carbon atoms, and may optionally contain heteroatoms, —COOH, and —$CH_2COOH$. Z can be independently selected from the following functional moieties

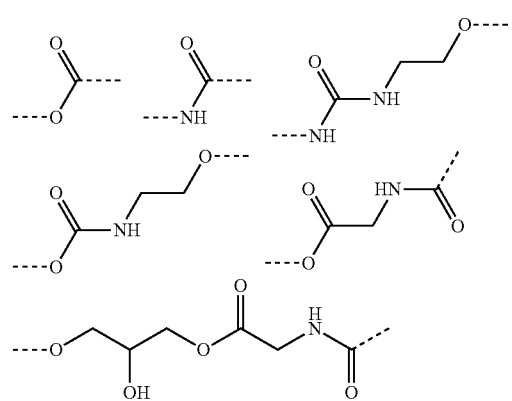

X can be a free-radical polymerizable group. Examples of suitable molecules are acrylate, acrylamide, methacrylate, methacrylamide, vinyl, allyl, methallyl, and internal olefinic bond containing molecules such as butenedioic acid, butenedioic esters or amides, itaconic acid, itaconic acid esters or amides, etc. In one aspect of the present invention, the organic monomers comprise substantially hydrophilic molecules with one free radical polymerization-effective group, for example, acrylic acid, methacrylic acid, N-vinylpyrrolidone, NIPAM (N-isopropylacrylamide), etc. In yet another aspect of the current invention, organic monomers can be selected from substantially less hydrophilic monomers with the limitation that the overall formulation is hydrophilic.

In one embodiment, a silicone monomer of the present invention has the structure:

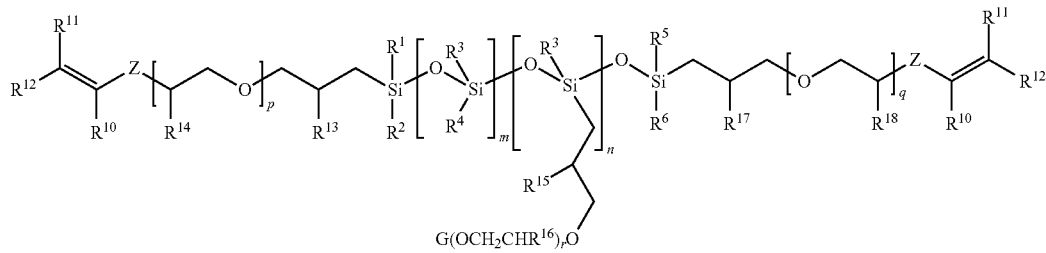

wherein $R^{13}$, $R^{14}$, $R^{16}$-$R^{18}$ are independently selected from hydrogen, methyl, ethyl, isopropyl, phenyl, phenylmethyl, naphthyl, naphthylmethyl, and —$CH_2CH_2CF_3$ radicals; $R^{15}$ is methyl; G is independently selected from hydrogen, alkyl, and aralkyl residues; subscripts p, q, and r are independently 0-50, such that p+q+r>0; and 1<(m+n)<500 subject to the limitation that n>0. In one embodiment, a composition is water dispersible or water soluble when p+q+r is 10-100, and m+n is 0-400.

In another embodiment, a silicone monomer of the present invention has the structure:

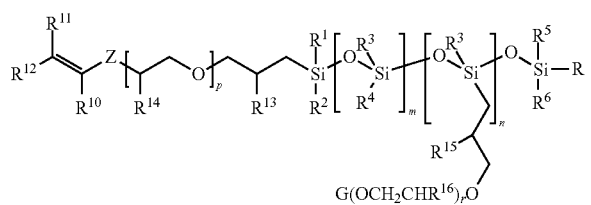

wherein $R^{13}$, $R^{14}$, $R^{16}$-$R^{18}$ are independently selected from hydrogen, methyl, ethyl, isopropyl, phenyl, phenylmethyl, naphthyl, naphthylmethyl, and —$CH_2CH_2CF_3$ radicals; $R^{15}$ is methyl; G is independently selected from hydrogen, alkyl, aryl, and aralkyl residues; subscripts p and r are independently 0-50, such that p+r>0; and 1<(m+n)<500 subject to the limitation that n>0.

The silicone hydrophilic macromers provide a material having a relatively high silicone concentration that is still miscible with hydrophilic co-monomers without the need for any homogenizing solvent, which provides silicone hydrogels that are transparent across the entire range of monomer-co-monomer compositions.

Miscibility (optimal solubility parameter) of the silicone macromer with different organic monomers is achieved by changing either or both the chain length of a polyether (hydrophile) or the ratio of alkylene oxides (for example ethylene oxide and propylene oxide) in the polyether chain. If the polyether chain is too short or too long, of the wrong average polarity, or absent, then miscibility with common unsaturated organic monomers may be poor and lead to opaque materials. Miscibility of silicone-polyether copolymers with unsaturated silicone reactants, solvents and polymers useful for the production of contact lens polymers is also similarly influenced. The size and structure of the silicone group can also be independently varied to influence miscibility, but if the amount of silicone relative to polar functional groups is too large, then the organosilicone monomer will be immiscible with polar organic monomers.

Conversely, if too little silicone is present in a silicone-polyether copolymer the desired characteristic of enhanced oxygen transport in a contact lens polymer may be diminished. The materials of the invention are actually distributions of compositions resulting from the underlying chemistry of the manufacture of silicone and polyether precursors that are themselves distributions of components. It may be desirable to control the nature of the distribution by chemical and/or physical processes that can remove or reduce the amount of a component or range of components in a distribution that would be less miscible with a particular set of monomers and other constituents in a formulation used to make a contact lens polymer.

The hydrosilylation reaction of compounds defined by $R^L$—$R^P$ with the silicone hydrides to make macromers of Formula (I) can be carried out with or without solvents and additives as described in U.S. Pat. Nos. 3,229,112; 4,847,398; 4,857,583; 5,191,103; or 5,159,096, the relevant portions thereof being incorporated herein by reference. A major advantage attendant to the selection of the alkyl branched unsaturated polyether (the $R^L$ portion of $R^L$—$R^P$) is the use of substantially stoichiometric amounts of the SiH and alkenyl functionalities. Thus, instead of the conventional 10 to 20 percent molar excess of the alkenyl polyether, the hydrosilylation step in synthesis of the instant invention can be done with essentially no molar excess of alkyl branched, unsaturated polyether. SiH/alkenyl stoichiometry in the range 0.99 to 1.09 is effective. Treatment of the polyether with ascorbic acid and ascorbates as taught in U.S. Pat. No. 5,986,122 improves hydrosilylation reactivity and permits use of reduced Pt-catalyst levels. The relevant teachings of this patent have been incorporated herein by reference.

Purification of the silicone and/or polyether reactants by distillation, high vacuum stripping, preparative chromatography or supercritical fluid extraction can be used to control the final copolymer distribution. Where small polyether reactants (number average of ether units in the polyether from about two to about six) are to be used to prepare a silicone-polyether copolymer, the removal of the alcohol starter and a single alkylene oxide adduct (that is the starter alcohol reacted with only one alkylene oxide unit) from the distribution is of interest. A purified polyether precursor where unreacted alcohol starter and single alkylene oxide adducts have been removed by distillation or high vacuum stripping, as non-limiting examples, is useful since it could be used as the starter to make short chain (about two to about six) polyether without zero or single ether adducts being present in concentrations that would interfere with a formulation used to produce a contact lens polymer.

Polymers and Hyrdogels

The hydrophilic silicone macromers may be used to form polymer compositions. The polymers may be homopolymers or copolymers. In one embodiment, the hydrophilic silicone macromers may be used to form homopolymers comprising one of the inventive macromers. In another embodiment, the hydrophilic silicone macromers may be used to form copolymers comprising (1) two or more structurally different hydrophilic silicone macromers, and/or (2) one or more hydrophilic silicone macromers and one or more monomers such as, for example, monomers suitable for use in forming silicone hydrogels.

In one embodiment, the present invention provides a copolymer comprising an inventive hydrophilic silicone macromer and a hydrophilic unsaturated organic monomer (a free-radical polymerizable organic monomer) suitable for use in silicone hydrogels. In one embodiment for making silicone hydrogels, the organic monomer is chosen from a vinylic monomer, an acrylide monomer, an acrylic monomer, or a combination of two or more thereof. Non-limiting examples of suitable vinylic monomers include N-vinyl-pyrrolidone, N-vinyl-caprolactam, N-vinyl-acetamide, N-vinyl-formamide and N-vinyl-isopropylamide, vinyl benzene, vinyl naphthalene, vinyl pyridine, vinyl alcohol, vinyl containing silicones, or a combination of two or more thereof. Non-limiting examples of suitable acrylic include 2-hydroxy-ethyl-methacrylate (HEMA), 2-hydroxy-ethyl-acrylate (HEA), hydroxyl propyl methacrylate, trimethyl-ammonium 2-hydroxy propyl methacrylate hydrochloride, dimethylaminoethyl methacrylate, glycerol methacrylate, N,N-dimethylacrylamide, N-isopropylacrylamide, acrylamide, methacrylamide, acrylic acid, methacrylic acid, acrylated hydrophilic or hydrophobic organo-silicones, or combinations of two or more thereof. In an exemplary embodiment, the organic monomer is chosen from N,N-dimethylacrylamide, 2-hydroxy-ethyl-methacrylate (HEMA), N-vinylpyrrolidone, and methacrylic acid.

The ratio of the silicone macromer of the present invention to the other hydrophilic unsaturated organic monomers is, in one embodiment from 1:100 to about 100:1; from 1:50 to about 50:1; from 1:25 to about 25:1; from 1:10 to about 10:1; from 1:5 to about 5:1; even about 1:1. In one embodiment, the hydrophilic silicone macromers are present in a hydrogel formulation in an amount of from about 5 weight percent to about 50 weight percent, from about 10 weight percent to about 40 weight percent; from about 15 weight percent to about 30 weight percent; even from about 20 weight percent to about 25 weight percent. Here as elsewhere in the specification and claims, numerical values can be combined to form new and non-disclosed ranges. Monomers and polymers with linear alkyl linked (meth)acrylated silicone polyether chains means those compounds without any branching in the linking group that connects the siloxane with the polyalkylene oxide part of the side chain in such compounds. Notations such as (meth)acrylate denote monomer with either acrylate or methacrylate functionality. The monomers of the present invention can be used to obtain cured elastomers with desirable physical strength and resistance to tearing after absorption of water. The mono-(meth)acrylate functionalized silicone monomers/polymers of the present invention and their preparation and use in contact lens are further described in the sections below.

In one embodiment, the present invention provides a hydrogel composition comprising (a) a hydrophilic silicone macromer in accordance with aspects of the invention, (b) a free-radical polymerizable organic monomer, (c) an initiator, and (d) optionally a cross-linking agent. The hydrophilic silicone macromer and free-radical polymerizable organic monomer can be as described above. The cross-linking agent can generally have two or more reactive functional groups at different sites of the molecule. Typically, these sites contain polymerizable ethylenic unsaturation groups. During curing, they form a covalent bond with two different polymer chains and form a stable three-dimensional network to improve the strength of the polymer. Cross-linking agents conventionally used in contact lenses include ethylene glycol dimethacrylate and trimethyloylpropane trimethacrylate (about 0.1 to 2 wt. %). Other useful cross-linking agents include diethyleneglycol dimethacrylate, bisphenol A dimethacrylate, diglycidyl bisphenol A dimethacrylate and dimethacrylate-terminated polyethylene glycol and reactive linear polyether modified silicones.

Initiators, for example, selected from materials well known for such use in the polymerization art, may be included in the lens-forming material in order to promote, and/or increase the rate of the polymerization reaction. An initiator is a chemical agent capable of initiating polymerization reactions. The initiator can be a photoinitiator or a thermal initiator.

A photoinitiator can initiate free radical polymerization and/or cross-linking by the use of light. Suitable photoinitiators are benzoin methyl ether, diethoxyacetophenone, a benzoylphosphine oxide, 2-hydroxy-2-methyl propiophenone (HMPP), 1-hydroxycyclohexyl phenyl ketone and Darocur or Irgacure types, preferably Darocur® 1173 and 2959. Examples of benzoylphosphine initiators include 2,4,6-trimethylbenzoyldiphenylphosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis (2-methylpropionitrile) (AIBN).

The polymers of this invention may also contain ultraviolet absorbents, pigments and colorants in the form of additives or co-monomers.

The present invention also provides silicone-hydrogel compositions comprising (meth)acrylate functionalized hydrophilic silicone monomer and conventional monomer such as HEMA or other contact lens monomers to produce soft, flexible water absorbing films. The homo and copolymers of the present invention are clear (no haze from poor miscibility) polymers that absorb about 10 wt. % to about 60 wt. % of water, showing excellent surface wettability and effective oxygen permeability, all of which are necessary for the better comfort and good health of the human cornea. The present invention also provides contact lenses made from the silicone-hydrogel films of the claimed invention. These embodiments are further described below.

To form polymers using the monomers of the present invention, the desired monomers are mixed and the resulting mixture is polymerized and cured to form transparent thin films by known thermal or UV cure techniques, using either peroxides or photoinitiators in the presence of cross-linking agents. The monomers added to the monomer mix to create the mixture prior to polymerization to form the polymers may be monomers or prepolymers. A "prepolymer" is a reaction intermediate polymer of medium molecular weight having polymerizable groups. Thus it is understood that the terms "silicone-containing monomers" and "hydrophilic monomers" include prepolymers. The present invention is also directed to silicone hydrogel films comprising the homopolymers or copolymers detailed above.

The monomers with high molecular weight polyether chains produced in the current invention may be used to form hydrophilic silicone homo/copolymers that produce silicone-hydrogel films having better oxygen permeability and significantly improved surface wettability in comparison to monomers with linear alkyl linking groups in the polyether chains. The contact lenses produced from the silicone-hydrogel films of the present invention do not require any expensive secondary treatments, like plasma oxidation or plasma coating, or internal wetting agents to improve wettability. That is, the contact lenses produced from silicone-hydrogel films of the present invention, without secondary treatment, are soft, flexible and inherently wettable and exhibit high oxygen permeability.

The polymers of the present invention form a clear, transparent homogeneous single-phase solution that can be cured directly without employing any additional homogenizing solvents, depending on the molecular weight of the present siloxane monomers, which are miscible with hydrophilic hydrogel monomers. Calculated solubility parameter values based on Fedors method (Robert F. Fedors, *Polymer Engineering and Science*, February 1974, vol. 14, No. 2) for the present inventive monomers range from approximately 16.5 to approximately 19 $(J/mol)^{1/2}$, which is closer to the solubility parameter value of conventional hydrogel monomers (such as HEMA, NVP and DMA) than silicone monomers such as TRIS. Miscibility is realized if the difference in solubility parameter between the instant inventive monomers and the hydrophilic co-monomers is less than about 7.7 $(J/mol)^{1/2}$.

In another embodiment of the present invention, the polymers may be formed into silicone-hydrogel films, via. processes known in the art. The silicone-hydrogel films of the present invention are soft, flexible and highly transparent. Silicone-hydrogel films made from the inventive monomers exhibit better surface wettability and oxygen permeability compared to ones made using monomers having linear alkyl linked methacrylated silicone polyether chains. The oxygen permeability of the hydrogel films or lenses can be tuned from 40 Dk to 400 Dk units by selecting the silicone monomers, independently or in combinations, of the present invention. The film H 17 listed in Table 2 herein showed an oxygen permeability value of 348 Dk. The present silicone hydrogel films were found to have dynamic advancing contact angles with water, in the range of 100° to 20° and absorb about 10 to 70 wt. % of water, which can vary depending on the molecular weight of the polyethers.

The contact angle can also be altered in the defined range by adding wetting agents like poly(vinyl pyrrolidone), poly (vinyl alcohol), and hydroxyalkyl cellulose. The silicone hydrogels also have good mechanical properties (such as low modulus and high tear strength) required for the contact lens application.

Conventional silicone-hydrogel films are generally produced by curing a mixture of hydrophobic silicone monomers and hydrophilic hydrogel monomers in the presence of about 10 to 40 wt. % of solvent, as they are incompatible with each other. However in the current invention, the inventive hydrophilic silicone macromers are found to be miscible with conventional hydrophilic hydrogel monomers (such as HEMA, NVP and DMA) and can form a homogeneous solution suitable to produce silicone-hydrogel films even in the presence of TRIS without employing any solvents or compatibilizers.

The densities of the present monomers generally range from 0.89-1.1 $g/cm^3$ at 25° C. and the refractive index range from 1.4-1.46 for the sodium D line. The instant inventors have found that monomers with refractive index greater than 1.431 and density greater than 0.96 $g/cm^3$ produce completely miscible compositions or pseudo miscible compositions that appear homogeneous, clear and transparent with hydrophilic monomers like 2-hydroxyethyl methacrylate (HEMA), in the absence of compatibilizing solvents. As has been stated above, conventional silicone monomers (for example, TRIS) must be mixed with hydrophilic monomers like HEMA in the presence of a solvent to get miscible compositions to make silicone hydrogels. The hydrogel co-monomer used to make silicone-hydrogel copolymers of the present invention can be hydrophilic acrylic monomers such as HEMA, N,N-dimethylacrylamide (DMA), N-vinylpyrrolidone (NVP), methacrylic acid (MAA) etc.

In the present invention, the resulting polymers may be formed into silicone-hydrogel films, via processes known in the art. Accordingly, the present invention is also directed to contact lens produced from either homo or copolymers of the present invention. The monomers/polymers of the present invention can be formed into contact lenses by spin casting processes, as disclosed in U.S. Pat. Nos. 3,408,429 and 3,496,254, cast molding processes, as disclosed in U.S. Pat. Nos. 4,084,459 and 4,197,266, combinations of methods thereof, or any other known method for making contact lenses. Polymerization may be conducted either in a spinning mold, or a stationary mold corresponding to a desired contact lens shape. The lens may be further subjected to mechanical finishing, as occasion demands. Polymerization may also be conducted in an appropriate mold or vessel to form buttons, plates, rods or tubes, which may then be processed (e.g., cut or polished via. lathe or laser) to give a contact lens having a desired shape.

The relative softness or hardness of the contact lenses fabricated from the resulting polymer of this invention can be varied by decreasing or increasing the molecular weight of the polysiloxane prepolymer end-capped with the activated unsaturated group (such as methacryloxy) or by varying the percent of the co-monomer. Generally, as the ratio of polysiloxane units to end-cap units increases, the softness of the material increases.

As stated above, the silicone-hydrogels of the present invention exhibit higher oxygen transport with improved surface wettable properties when compared to silicone-polyether copolymers having linear alkyl linking groups. The monomers and prepolymers employed in accordance with this invention are readily polymerized to form three-dimensional networks, which permit the transport of oxygen with improved wettability along with better mechanicals and optical clarity.

For example, the silicone hydrogel film produced with 20 wt. % of Example 8, 5 wt. % of Example 5, 5 wt. % of Example 2, 30 wt. % of MAMSP 4, 5 wt. % of TRIS, 10 wt. % of HEMA, 20 wt. % of DMA and 5 wt. % of NVP co-monomer (see Example H 16) shows lower captive bubble contact angle (below 40°) and low modulus (below 1.2 MPa) as against the silicone hydrogel films produced with corresponding silicone-polyether having linear alkyl linking groups, which shows, captive contact angle beyond 50° and a modulus greater than 2 MPa for composition with HEMA. Similar trends were observed for silicone-hydrogels produced with different compositions of HEMA, DMA, NVP, and macromers in accordance with aspects of the present invention.

Specific use of the films include intraocular contact lenses, artificial corneas, and soft disposable long-wear contact lenses or as coatings for biomedical devices.

In one aspect the composition comprising the said hydrophilic silicone macromer is homo or copolymers with other free radical polymerization effective monomers to form materials in bulk or latex form. These homopolymer, copolymer, emulsion and latex particles comprising the macromer of current invention can be used as ingredients in personal care formulations including skin care, hair care, and nail care, such as lipsticks, mascaras, foundations, lotions, creams, shampoos, conditioners and nail polishes, to improve their ware, tactile properties and ease of application. They also can be used in textile and fiber treatment applications to impart smooth, soft feel and wettability to both natural and synthetic fibers. Finally the homopolymer, copolymer, emulsion and latex particles can be incorporated into coating formulations for metal, plastic, wood and paper, such as varnishes, latex paints and roofing compositions.

Aspects of the invention may be further understood with reference to the following non-limiting examples.

EXAMPLES

Hydrophilic Silicone Monomers

Example 1

A reactor with three necks fitted with a condenser, temperature probe and an addition funnel, was charged with 7.55 g of methallyl alcohol started polyether with 1.953 meq/g of hydroxyl content and 15 ppm (as Pt) of 5% chloroplatinic acid in IPA (2-propanol). The mixture was heated to 85-90° C. and 5 g of α-dimethylbutylsiloxy-ω-dimethylhydrogensiloxy capped polydimethylsiloxane with 2.950 meq/g of hydride was added drop wise. Once the exotherm ceased, the reaction was continued at 95-100° C. for 6 hours and completion of reaction was confirmed with $^1$H and $^{29}$Si-NMR's. To this material about 30 mL of toluene is added and the reactor was cooled over ice/water bath and 2.7 g of triethylamine was added. To this cold solution, 1.8 g methacryloyl chloride was added drop wise, and the reaction was allowed to continue for about 4 hours after which the material was filtered several time to remove all the salts produced. The clear solution obtained after filtration then stirred over 20 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 2

A reactor with three necks fitted with a condenser and temperature probe, was charged with 6.7 g of methallyl alcohol started polyether with 1.799 meq/g of hydroxyl content, 13 g of α-dimethylbutylsiloxy-ω-dimethylhydrogensiloxy capped polydimethylsiloxane with 0.927 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 30 mL of toluene is added, and the reactor was cooled over ice/water bath and 2.7 g of triethylamine was added. To this cold solution, 1.9 g methacryloyl chloride was added drop wise and the reaction was allowed to continue for about 4 hours after which the materials was filtered several time to remove all the salts produced. The clear solution obtained after filtration was then stirred over 40 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 3

A reactor with three necks fitted with a condenser and temperature probe, was charged with 16.3 g of methallyl alcohol started polyether with 1.953 meq/g of hydroxyl content, 10 g of bis-α,ω-dimethylhydrogensiloxy capped polydimethylsiloxane with 3.680 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 100 mL of hexane is added, and the reactor was cooled over ice/water bath and 7.5 g of triethylamine was added. To this cold solution, 5 g methacryloyl chloride was added drop wise and reaction was allowed to continue for about 4 hours after which the materials was filtered several time to remove all the salts produced. The clear solution obtained after filtration was then stirred over 30 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 4

A reactor with three necks fitted with a condenser and temperature probe, was charged with 22.3 g of methallyl alcohol started polyether with 1.799 meq/g of hydroxyl content, 25 g of bis-α,ω-dimethylhydrogensiloxy capped polydimethylsiloxane with 1.517 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 35 mL of toluene is added and the reactor was cooled over ice/water bath and 5.6 g of triethylamine was added. To this cold solution, 3.9 g methacryloyl chloride was added drop wise, and the reaction was allowed to continue for about 4 hours after which the materials was filtered several times to remove all the salts produced. The clear solution obtained after filtration was then stirred over 30 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 5

A reactor with three necks fitted with a condenser and temperature probe, was charged with 24.0 g of methallyl alcohol started polyether with 1.953 meq/g of hydroxyl content, 75.0 g of bis-α,ω-dimethylhydrogensiloxy capped polydimethylsiloxane with 0.577 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 50 mL of toluene is added and the reactor was cooled over ice/water bath and 2.7 g of triethylamine was added. To this cold solution, 2.7 g methacryloyl chloride was added drop wise, and the reaction was allowed to continue for about 4 hours after which the materials was filtered several time to remove all the salts produced. The clear solution obtained after filtration was then stirred over 50 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 6

A reactor with three necks fitted with a condenser and temperature probe, was charged with 16 g of allyl alcohol started polyether with 2.439 meq/g of hydroxyl content, 10 g of bis-α,ω-dimethylhydrogensiloxy capped polydimethylsiloxane with 3.680 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 100 mL of hexane is added and the reactor was cooled over ice/water bath and 7 g of triethylamine was added. To this cold solution, 6.8 g methacryloyl chloride was added drop wise and the reaction was allowed to continue for about 4 hours after which the materials was filtered several time to remove all the salts produced. The clear solution obtained after filtration then stirred over 30 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 7

A reactor with three necks fitted with a condenser and temperature probe, was charged with 43.2 g of allyl alcohol started polyether with 1.858 meq/g of hydroxyl content, 50 g of bis-α,ω-dimethylhydrogensiloxy capped polydimethylsiloxane with 1.517 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. To this material about 70 mL of toluene is added and the reactor was cooled over ice/water bath and 11.2 g of triethylamine was added. To this cold solution, 7.8 g methacryloyl chloride was added drop wise, and the reaction was allowed to continue for about 4 hours after which the materials was filtered several time to remove all the salts produced. The clear solution obtained after filtration then stirred over 50 g of basic ion exchange resin (Tulsion from Thermax India Ltd.) for 10 hours to remove any access methacrylic acid followed by solvent stripping in a rotary evaporator at 50° C. and 30 mBar pressure to obtain a clear liquid. The completion of methacrylation was confirmed by Proton-NMR.

Example 8

A reactor with three necks fitted with a condenser and temperature probe, was charged with 6.7 g of methallyl alcohol started polyether with 1.799 meq/g of hydroxyl content, 13 g of α-dimethylbutylsiloxy-ω-dimethylhydrogensiloxy capped polydimethylsiloxane with 0.927 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1$H and $^{29}$Si-NMR's. The tosylation was carried out by placing the hydrosilylated product (50 g, 0.03 mol) and triethylamine (8.5 mL, 0.06 mol) in a 500 mL three neck r.b.flask fitted with a reflux condenser and a dropping funnel. The nitrogen gas was continuously purged during the reaction at rate of about 20-30 bubbles per minute in a bubbler connected to the third neck of the flask using an adapter and a rubber tube. To a stirring reactant was added anhydrous tetrahydrofuran (25 mL) and stirring was continued. The reaction temperature was increased to 65° C. and maintained throughout the reaction. p-toluenesulfonyl chloride (7.6 g, 0.04 mol) was added pinch by pinch for 30-35 minutes. A white precipitate of triethylammonium salt precipitated out within 45 minutes of the reaction. The reaction time was 4-5 hours. After the reaction, organic salt was filtered out and the filtrate was concentrated under reduced pressure on a rotary evaporator. After removal of the solvent some more organic salt separated out of the product after storage for 12 hours at 27° C. Filtration resulted in a tosylate terminated silicone polyether in quantitative yield. This product was confirmed by the NMR technique. N-methacryloyl glycine used for the final step was synthesized as follows; 25 g (0.33 mol) of glycine was added pinch by pinch to a 250 mL round bottom flask containing aqueous NaOH solution (34 g, 0.83 mol) in 100 mL deionized water. The flask was cooled to 0-5° C. using ice-salt bath. Methacryloyl chloride (39 mL, 0.39 mol) was added dropwise for 30-45 min. maintaining the bath temperature below 5° C. Then the reaction mixture was allowed to warm to room temperature. The reaction mixture was acidified to pH 3 and extracted 4 times with ethyl acetate (40 mL×4). The ethyl acetate layer was separated using a separating funnel and transferred to a conical flask containing anhydrous sodium sulfate (50 g). The ethyl acetate was decanted to a round bottom flask, and the solvent was removed under reduced pressure to obtain glycine methacrylamide as a white solid powder. This product was confirmed by the NMR technique. For the final $SN^2$ reaction, the tosylate terminated silicone polyether (40 g, 0.015 mol) was reacted with DBU (1,8-diazabicylco[5.4.0]undec-7-ene, 3.4 g, 0.02 mol) and N-methacryloyl glycine (4.02 g, 0.02 mol) using N,N-dimethylformamide (30 mL) as the solvent in a 250 mL two necked round bottom flask fitted with a reflux condenser, heating bath, and a nitrogen bubbler. 100-200 PPM of hydroquinone was used during the reaction to avoid unexpected polymerization. The temperature of the heating bath was maintained at 65° C. during the reaction. After 12 hours, N,N-dimethylformamide was removed under reduced pressure using a rotary evaporator (70° C., 20 mbar). The crude material was dissolved in 25 mL ethyl acetate and washed with brine solution (15 mL×3). The chloroform layer was separated, dried over anhydrous $Na_2SO_4$, decolorized from activated charcoal, and the solvent was removed under reduced pressure in a rotary evaporator. The final product was obtained in quantitative yield. The final product was well characterized by infrared spectroscopy, multinuclear NMR ($^1H$, $^{13}C$, $^{29}Si$) spectroscopy.

Example 9

A reactor with three necks fitted with a condenser and temperature probe, was charged with 24 g of methallyl alcohol started polyether with 1.953 meq/g of hydroxyl content, 75 g of α-dimethylbutylsiloxy-ω-dimethylhydrogensiloxy capped polydimethylsiloxane with 0.577 meq/g of hydride and 75 ppm of sodium propionate. This mix was slowly heated to 95° C., and 25 ppm of Pt(0) catalyst was added at 65° C. Once the exotherm ceased, the reaction was continued at 95-100° C. for 6 hours and completion of reaction was confirmed with $^1H$ and $^{29}Si$-NMRs. The tosylation was carried out by placing the hydrosilylated product (50 g, 0.01 mol) and triethylamine (4 mL, 0.03 mol) in a 500 mL three neck round bottom flask fitted with a reflux condenser and a dropping funnel. The nitrogen gas was continuously purged during the reaction at rate of about 20-30 bubbles per minute in a bubbler connected to the third neck of the flask using an adapter and a rubber tube. To a stirring reactant was added anhydrous tetrahydrofuran (25 mL) with continued stirring. The reaction temperature was increased to 65° C. and maintained throughout the reaction. p-toluenesulfonyl chloride (4.6 g, 0.02 mol) was added pinch by pinch for 30-35 minutes. A white precipitate of triethylammonium salt precipitated out within 45 minutes of the reaction. The reaction time was 4-5 hours. After the reaction, organic salt was filtered out and the filtrate was concentrated under reduced pressure on a rotary evaporator. After removal of the solvent some more organic salt separated out of the product after storage for 12 hours at 27° C. Filtration resulted in a tosylate terminated silicone polyether in quantitative yield. This product was confirmed by the NMR technique. N-methacryloyl glycine used for the final step was synthesized as follows; 25 g (0.33 mol) of glycine was added pinch by pinch to a 250 mL round bottom flask containing aqueous NaOH solution (34 g, 0.83 mol) in 100 mL deionized water. The flask was cooled to 0-5° C. using an ice-salt bath. Methacryloyl chloride (39 mL, 0.39 mol) was added dropwise for 30-45 min. maintaining the bath temperature below 5° C. Then the reaction mixture was allowed to warm to room temperature. The reaction mixture was acidified to pH 3 and extracted 4 times with ethyl acetate (40 mL×4). The ethyl acetate layer was separated using a separating funnel and transferred to a conical flask containing anhydrous sodium sulfate (50 g). The ethyl acetate was decanted to round bottom flask, and the solvent was removed under reduced pressure to obtain glycine methacrylamide as a white solid powder. This product was confirmed by the NMR technique. For the final $SN^2$ reaction, the tosylate terminated silicone polyether (20 g, 0.004 mol) was reacted with DBU (1.37 g, 0.009 mol) and glycine methacrylamide (1.3 g, 0.009 mol) using N,N-dimethylformamide (25 mL) as the solvent in a 250 mL two necked round bottom flask fitted with a reflux condenser, heating bath, and a nitrogen bubbler. 100-200 PPM of hydroquinone was used during the reaction to avoid unexpected polymerization. The temperature of the heating bath was maintained at 65° C. during the reaction. After 12 hours, N,N-dimethylformamide was removed under reduced pressure using a rotary evaporator (70° C., 20 mbar). The crude material was dissolved in 25 mL ethyl acetate and washed with brine solution (15 mL×3). The chloroform layer was separated, dried over anhydrous $Na_2SO_4$, decolorized from activated charcoal, and the solvent was removed under reduced pressure in a rotary evaporator. The final product was obtained in quantitative yield. The final product was well characterized by infrared spectroscopy, multinuclear NMR ($^1H$, $^{13}C$, $^{29}Si$) spectroscopy.

Examples of Hydrogel Films

Various hydrogel films (H1-H19) were prepared incorporating the hydrophilic silicone macromer materials of Examples 1-9 with other monomers such as hydroxyethylmethacrylate (HEMA), dimethylacrylamide (DMA), N-vinylpyrrolidone (NVP), trisiloxane grafted methallylpolyether methacrylate with 4 moles of ethyleneoxide (MAMSP4), trisiloxane grafted methallylpolyether N-methacryloyl glycine ester with 4 moles of ethyleneoxide (MAMSP 4Am), trisiloxane grafted methallylpolyether methacrylate with 4 moles of ethyleneoxide (MAMSP8), and optionally with cross-linkers such as ethyleneglycoldimethacrylate (EGDMA). All the films were cured using 0.5% of benzoylperoxide (BPO) at 80-85° C. for 2-3 hours or UV cured for 5-60 seconds with 0.5% 2-hydroxy-2-methyl-propiophenone (HMPP) in transparent molds made up of glass, polypropylene, or polyesters. Details of the formulations and the properties of the hydrogel films are summarized in the following tables.

TABLE 1

| Ingredients (%) | H1 | H2 | H3 | H4 | H5 | H6 | H7 | H8 | H9 | H10 |
|---|---|---|---|---|---|---|---|---|---|---|
| Example 1 | 49.5 | | | | | | | | | |
| Example 2 | | 49.5 | 24.8 | 39.8 | | | | | | |
| Example 3 | | | | | | 10 | | | | |
| Example 4 | | | | | 10 | | | 10 | | |
| Example 5 | | | | | | | | | 49.8 | 10 |
| Example 6 | | | | | | | 49.8 | | | |
| Example 7 | | | | | 49.8 | | | | | |

TABLE 1-continued

| Ingredients (%) | H1 | H2 | H3 | H4 | H5 | H6 | H7 | H8 | H9 | H10 |
|---|---|---|---|---|---|---|---|---|---|---|
| Example 8 | | | | | | | | | | |
| Example 9 | | | | | | | | | | |
| MAMSP 4 | | | 24.7 | | | | | | | |
| MAMSP 4Am | | | | | | | | | | |
| MAMSP 8 | | | | | | 39.8 | | 39.8 | | 39.8 |
| TRIS | | | | | | | | | | |
| DMA | 24.8 | 24.8 | 24.8 | 24.9 | 24.9 | 24.9 | 24.9 | 24.9 | 24.9 | 24.9 |
| HEMA | 19.8 | 19.8 | 19.7 | 19.9 | 19.9 | 19.9 | 19.9 | 19.9 | 19.9 | 19.9 |
| NVP | 5 | 5 | 5 | 5 | 5 | 5 | 5 | 5 | 5 | 5 |
| EGDMA | 0.5 | 0.5 | 0.5 | | | | | | | |
| BPO | 0.5 | 0.5 | 0.5 | 0.5 | 0.5 | 0.5 | 0.5 | 0.5 | 0.5 | |
| HMPP | | | | | | | | | | 0.5 |
| Properties of the hydrogel films | | | | | | | | | | |
| Water uptake (wt. %) | 54 ± 2 | 45 ± 2 | 40 ± 2 | 30 ± 2 | 38 ± 2 | 47 ± 2 | 39 ± 2 | 52 ± 2 | 39 ± 2 | 47 ± 2 |
| Contact angle (captive bubble) | 34 ± 2 | 33 ± 2 | 39 ± 2 | 35 ± 2 | 30 ± 2 | 28 ± 2 | 35 ± 2 | 30 ± 2 | 38 ± 2 | 28 ± 2 |
| % Transmission (1 mm thickness) | 94 | 94 | 91 | 94 | 92 | 95 | 90 | 92 | 95 | 94 |
| Modulus (MPa) | 2 ± 0.5 | 2 ± 0.5 | 2 ± 0.5 | 3 ± 0.5 | 9 ± 2 | 2 ± 0.5 | 8 ± 2 | 2 ± 0.5 | 4 ± 1 | 1.1 ± 0.2 |

TABLE 2

| Ingredients (%) | H11 | H12 | H13 | H14 | H15 | H16 | H17 | H18 | H19 |
|---|---|---|---|---|---|---|---|---|---|
| Example 1 | | | | | | | | | |
| Example 2 | | | | 19.8 | | 5 | | | |
| Example 3 | | | | | | | | | |
| Example 4 | | | | | | | | | |
| Example 5 | 5 | 10 | 5 | | 5 | 5 | | | |
| Example 6 | | | | | | | | | |
| Example 7 | | | | | | | | | |
| Example 8 | | | | | 19.9 | 19.9 | | | |
| Example 9 | | | | | | | 79.6 | 74.6 | 99.5 |
| MAMSP 4 | | | | | 19.9 | 29.9 | | | |
| MAMSP 4Am | | | 39.6 | 19.8 | | | | | |
| MAMSP 8 | 44.8 | 39.8 | | | | | | | |
| TRIS | | | 5 | 10 | 5 | 5 | 19.9 | 10 | |
| DMA | 24.9 | 34.8 | 24.8 | 24.8 | 24.9 | 19.9 | | | |
| HEMA | 19.9 | 10 | 19.8 | 19.8 | 19.9 | 10 | | | |
| NVP | 5 | 5 | 5 | 5 | 5 | 5 | | 14.9 | |
| EGDMA | | | 0.5 | 0.5 | | | | | |
| BPO | | | | | | | | | |
| HMPP | 0.5 | 0.5 | 0.5 | 0.5 | 0.5 | 0.5 | 0.5 | 0.5 | 0.5 |
| Properties of the hydrogel films | | | | | | | | | |
| Water uptake (wt. %) | 30 ± 2 | 45 ± 2 | 35 ± 2 | 30 ± 2 | 55 ± 2 | 44 ± 2 | 15 ± 2 | 30 ± 2 | 15 ± 2 |
| Contact angle (captive bubble) | 29 ± 2 | 30 ± 2 | 33 ± 2 | 36 ± 2 | 30 ± 2 | 30 ± 2 | 30 ± 2 | 25 ± 2 | 23 ± 2 |
| % Transmission (1 mm thickness) | 94 | 94 | 95 | 94 | 90 | 90 | 96 | 95 | 95 |
| Modulus (MPa) | 0.8 ± 0.2 | 0.9 ± 0.2 | 0.7 ± 0.2 | 0.9 ± 0.2 | 0.8 ± 0.2 | 1 ± 0.2 | 2 ± 0.5 | 4 ± 1 | 3 ± 0.5 |

While the invention has been described with reference to various embodiments, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A composition comprising at least one hydrophilic silicone macromer of the Formula 1:

$$R-Si(R^1)(R^2)O-(Si(R^3)(R^4)O)_a-Si(R^5)(R^6)-Y \qquad (1)$$

wherein $R^1$, $R^2$, $R^3$ $R^4$, $R^5$, and $R^6$ are independently selected from a monovalent linear, branched, or cyclic radical with 1 to 50 carbon atoms and optionally contain I;

wherein I is $R^L-R^P$; $R^L$ is a linking residue from non-isomerizable hydrosilylation effective terminal olefin comprising the general structure —CH$_2$—C(R$^b$R$^7$)—(CR$^8$R$^9$)$_n$, n is selected from integers from 1 to 10; R$^7$, R$^8$ and R$^9$ are independently selected from hydrogen, a mono-valent hydrocarbon radical with 1 to 10 carbon atoms, that does not contain a heteroatom; R$^b$ is selected from a monovalent hydrocarbon radical with 1 to 6 carbon atoms; R$^P$ is a hydrogen, a hydroxyl radical, or a hydrophilic organic radical with 1 to 100 carbon atoms that optionally contain a heteroatom; a is 0 to about 500;

wherein R is a linear or branched alkyl having 1 to 10 carbon atoms;

wherein Y is a free radical polymerization-effective group containing I—Z, where Z is a functional moiety, independently selected from a bivalent linear, branched, or cyclic radical with 1 to about 20 carbons that optionally contain a heteroatom; and wherein at least one of R$^1$, R$^2$, R$^3$ R$^4$, R$^5$, or R$^6$ contains an I group where R$^p$ is a hydrophilic organic radical.

2. The composition of claim 1, where R$^1$, R$^2$, R$^3$, R$^4$, R$^5$, and R$^6$ are independently selected from methyl, ethyl, propyl, isopropyl, phenyl, polyether, and —CH$_2$CH$_2$CF$_3$ groups; R is selected from methyl, ethyl, propyl, isopropyl, butyl, and isobutyl groups; the subscript a is selected from 0 to 50; R$^b$ is methyl; R$^7$, R$^8$ and R$^9$ are hydrogen atoms; the subscript n is selected from 1 to 6; R$^p$ includes a polyether group with the general formula:

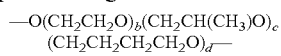

where the subscript b is 1 to 100, subscript c is 0 to 100, and subscript d is 0 to 100 such that b+c+d>0; the free radical polymerizable group Y is selected from an acrylate or an acrylamide with the general formula:

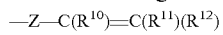

where R$^{10}$, R$^{11}$, and R$^{12}$ are independently selected from hydrogen and a monovalent alkyl group with 1 to 10 carbon atoms, that optionally contain a heteroatom, —COOH, and —CH$_2$COOH.

3. The composition of claim 1, wherein a is 1 to 50.

4. The composition of claim 1, wherein n is 1 to 6.

5. The composition of claim 1 wherein Z is independently selected from one or more of the following functional moieties:

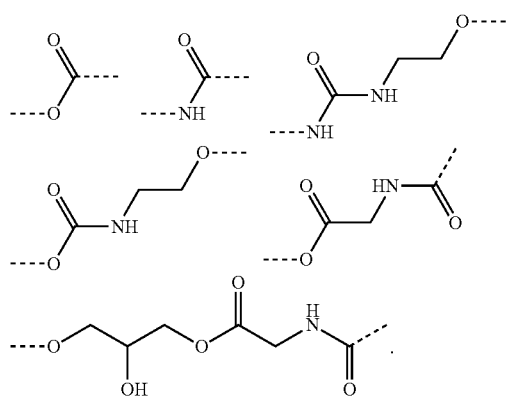

6. The composition of claim 1, wherein Y is chosen from an acrylate, an acrylamide, a methacrylate, a methacrylamide, a vinyl, an alkyl, a methalkyl, an internal olefinic bond containing molecule, or a combination of two or more thereof.

7. The composition of claim 1, comprising the silicone monomer of the formula:

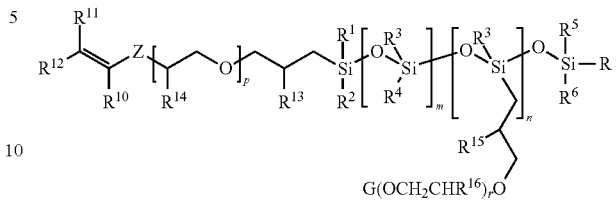

wherein R$^{10}$, R$^{11}$, and R$^{12}$ are independently selected from hydrogen and a monovalent alkyl group with 1 to 10 carbon atoms, that optionally contain a heteroatom, —COOH, and —CH$_2$COOH; R$^{13}$ and R$^{17}$ are independently selected from methyl, ethyl, isopropyl, phenyl, phenylmethyl, naphthyl, naphthylmethyl, and —CH$_2$CH$_2$CF$_3$ radicals; R$^{14}$, R$^{16}$, and R$^{18}$ are independently selected from hydrogen, ethyl, isopropyl, phenyl, phenylmethyl, naphthyl, naphthylmethyl, and —CH$_2$CH$_2$CF$_3$ radicals; R$^{15}$ is methyl; G is independently selected from hydrogen, alkyl, aryl, and aralkyl residues; subscripts p and r are independently 0-50 such that p+r>0; and 1<(m+n)<500, subject to the limitation that n>0.

8. The composition according to claim 1, wherein the composition is a hydrogel.

9. The hydrogel of claim 8, further comprising a free-radical polymerizable organic monomer, an initiator, and optionally a crosslinker.

10. The hydrogel of claim 9, wherein the free-radical polymerizable organic monomer is chosen from a vinylic monomer, an acrylide monomer, an acrylic monomer, or a combination of two or more thereof.

11. The hydrogel of claim 9, wherein the vinylic monomer is chosen from N-vinyl-pyrrolidone, N-vinyl-caprolactam, N-vinyl-acetamide, N-vinyl-formamide, N-vinyl-isopropylamide, vinyl benzene, vinyl naphthalene, vinyl pyridine, vinyl alcohol, vinyl containing silicone, or a combination of two or more thereof.

12. The hydrogel of claim 9, wherein the acrylic monomer is chosen from 2-hydroxy-ethyl-methacrylate (HEMA), 2-hydroxy-ethyl-acrylate (HEA), hydroxyl propyl methacrylate, trimethylammonium 2-hydroxy propyl methacrylate hydrochloride, dimethylaminoethyl methacrylate, glycerol methacrylate, N,N-dimethylacrylamide, N-isopropylacrylamide, acrylamide, methacrylamide, acrylic acid, methacrylic acid, acrylated hydrophilic or hydrophobic organo-silicone, or a combination of two or more thereof.

13. The hydrogel of claim 9, wherein the hydrophilic silicone macromer is present in an amount of from about 5 weight percent to about 50 weight percent of the hydrogel composition.

14. The hydrogel of claim 9, wherein the ratio of the hydrophilic silicone macromer to the free-radical polymerizable organic monomer is from about 1:100 to about 100:1 wt. %.

15. The hydrogel of claim 9, wherein the ratio of the hydrophilic silicone macromer to the free-radical polymerizable organic monomer is from about 1:50 to about 50:1 wt. %.

16. The hydrogel of claim 9, wherein the ratio of the hydrophilic silicone macromer to the free-radical polymerizable organic monomer is from about 1:10 to about 10:1 wt. %.

17. The hydrogel of claim 9, wherein the ratio of the hydrophilic silicone macromer to the free-radical polymerizable organic monomer is about 1:1 wt. %.

18. The composition of claim 8, optionally comprising a cross-linker chosen from ethylene glycol dimethacrylate, trimethyloylpropane trimethacrylate, diethyleneglycol dimethacrylate, bisphenol A dimethacrylate, diglycidyl bisphenol A dimethacrylate, dimethacrylate-terminated polyethylene glycol, a reactive linear or pendant polyether modified silicone, or a combination of two or more thereof.

19. The hydrogel composition of claim 8, wherein the composition comprises a thermal or a photo initiator chosen from 2,2'-azobis (2,4-dimethylpentanenitrile), 2,2'-azobis (2-methylpropanenitrile), 2,2'-azobis (2-methylbutanenitrile), peroxides, benzoin methyl ether, diethoxyacetophenone, a benzoylphosphine oxide, 2-hydroxy-2-methyl propiophenone (HMPP), 1-hydroxycyclohexyl phenyl ketone, or a combination of two or more thereof.

20. A contact lens comprising a hydrogel film formed from the composition of claim 8.

21. The contact lens according to claim 20 comprising a limited extraction protocol that further comprises a green or aqueous solvents chosen from water, an organic or inorganic salt solutions, a buffer, an emulsion, a commercial lens cleaning solution, or an ophthalmically compatible solvent in the temperature range of 15-125° C. for extraction.

22. The composition according to claim 1, wherein the composition is a polymer.

23. The composition of claim 22 comprising free-radically polymerized emulsions and latex compositions.

24. The free radical polymerized composition according to claim 23, wherein the composition is a film forming additive in a textile, paper, leather, personal care, health care, home care, coating, painting or seed treatment formulation.

* * * * *